United States Patent [19]

McCormick

[11] 4,407,202

[45] Oct. 4, 1983

[54] HYDRAULICALLY ACTUATED RAILWAY CAR DUMPING SYSTEM

[76] Inventor: Dennis L. McCormick, 551 Emerson Ave. West, Mendota Heights, Minn. 55118

[21] Appl. No.: 136,807

[22] Filed: Apr. 3, 1980

[51] Int. Cl.³ .................... B60P 1/16; B61D 9/02; B61D 9/06
[52] U.S. Cl. .................... 105/271; 105/273; 298/18; 298/22 P
[58] Field of Search .................... 105/271, 273, 274; 298/18, 22 P

[56] References Cited

U.S. PATENT DOCUMENTS

| | | | |
|---|---|---|---|
| 1,960,574 | 5/1934 | Cartzdafner | 105/271 |
| 1,990,057 | 2/1935 | Anderson | 105/271 |
| 2,143,934 | 1/1939 | Burner | 298/22 P |
| 2,145,881 | 2/1939 | King | 105/271 X |
| 2,647,471 | 8/1953 | Lunde | 105/271 |
| 4,131,070 | 12/1978 | Jonnet | 105/274 X |
| 4,240,355 | 12/1980 | Puariea | 105/271 X |

*Primary Examiner*—Joseph F. Peters, Jr.
*Assistant Examiner*—Howard Beltran
*Attorney, Agent, or Firm*—Kinney, Lange, Braddock, Westman and Fairbairn

[57] ABSTRACT

A railroad dump car, such as a side dump rail car, uses hydraulic actuators to tilt the dump body to permit unloading of the contents of the dump body. A hydraulic booster pump is connected to the auxiliary air supply of the train. The booster pump converts the relatively low pressure (about 90 psi) air to a high hydraulic pressure (about 3000 psi). In another embodiment, a bidirectional rotary pump driven from the rail car axle pumps the hydraulic fluid. The booster pump (or the bidirectional rotary pump) pumps hydraulic fluid from a hydraulic reservoir to a hydraulic accumulator, which receives the hydraulic fluid and stores the hydraulic fluid under pressure. When the hydraulic accumulator is fully charged, the operator triggers a valve to cause dumping. The valve causes the hydraulic accumulator means to supply the pressurized hydraulic fluid to the hydraulic actuators, which pivot the dump body with respect to the car frame to unload the contents of the dump body.

18 Claims, 5 Drawing Figures

HYDRAULICALLY ACTUATED RAILWAY CAR DUMPING SYSTEM

BACKGROUND OF THE INVENTION

1. Field of the Invention

The present invention relates to railroad dump cars. In particular, the present invention is a hydraulically powered system for operating the dumping mechanism of the dump car.

2. Description of the Prior Art

Since about 1920, the railroad industry has built what is known as a side dump rail car. The car consists of a main car frame and a dump body pivotally connected to the car frame so that it is capable of tilting to a 45° angle, on either side of center. As the dump body tilts, a side door also drops. This design is well suited for unloading bulk commodities and large, difficult to handle material.

The overall design of side dump rail cars has not changed materially in 60 years. Power to lift either side of the dump body comes from a pair of approximately 26" bore telescopic air cylinders mounted directly under each side of the dump body (four cylinders in all per car). By operating a control lever on one side of the car, air from the train's auxiliary air system is directed to the air cylinders on the same side of the car as the lever. This causes dumping of the contents of the car on the opposite side of the car from the operator.

The prior art air operated dump car systems have several significant disadvantages. First, water vapor in the train's auxiliary air system can condense in the rail car components and piping and freeze during cold winter months in northern climates. This prevents operation of the air operated dumping system.

Second, the compressibility of the air poses serious safety hazards. For example, it can create a condition where the car dumping cannot be stopped due to the residual forces of the compressed air, even though the control lever has been released. This can cause derailing of the dump car.

Third, the large bore air cylinders required to pivot the dump body cannot be made really tight. Piston bypass leakage allows rapid settling of the car in midposition. This also poses a significant safety hazard.

Fourth, the prior art systems are expensive to build and maintain. The large bore air cylinders are specially made, difficult to obtain, and expensive. In addition, due to the large size and weight of the air cylinders, replacement of a worn-out or defective air cylinder with a new air cylinder is time-consuming and expensive.

Other types of railroad dump cars, such as bottom slide gate cars, also use air cylinders to move a movable dumping mechanism to thereby unload the contents of the dump car. Like the side dump rail car, these other air operated dump cars suffer from serious performance, safety, and cost disadvantages associated with the air cylinder system.

SUMMARY OF THE INVENTION

The present invention is an improved apparatus for use in a railroad dump car having a movable dump mechanism for unloading the contents of the dump car. The present invention converts an available source of energy, such as low pressure air from the train's air supply or the rotary motion of the car's axle, to a hydraulic pressure. This hydraulic pressure is used to operate hydraulic actuator means, which moves the movable dump mechanism. The present invention includes pump means driven by the available source of energy which pumps hydraulic fluid under pressure from hydraulic reservoir means to hydraulic accumulator means. The hydraulic fluid is stored under pressure by the hydraulic accumulator means, to be used in driving the hydraulic actuator means.

Operation of the dump mechanism is commenced by valve means, which selectively causes the hydraulic accumulator means to supply pressurized fluid to the hydraulic actuator means. The pressurized hydraulic fluid causes the hydraulic actuator means to move the dump mechanism, thereby unloading the contents of the dump car.

DETAILED DESCRIPTION OF THE PREFERRED EMBODIMENTS

Figure 1:
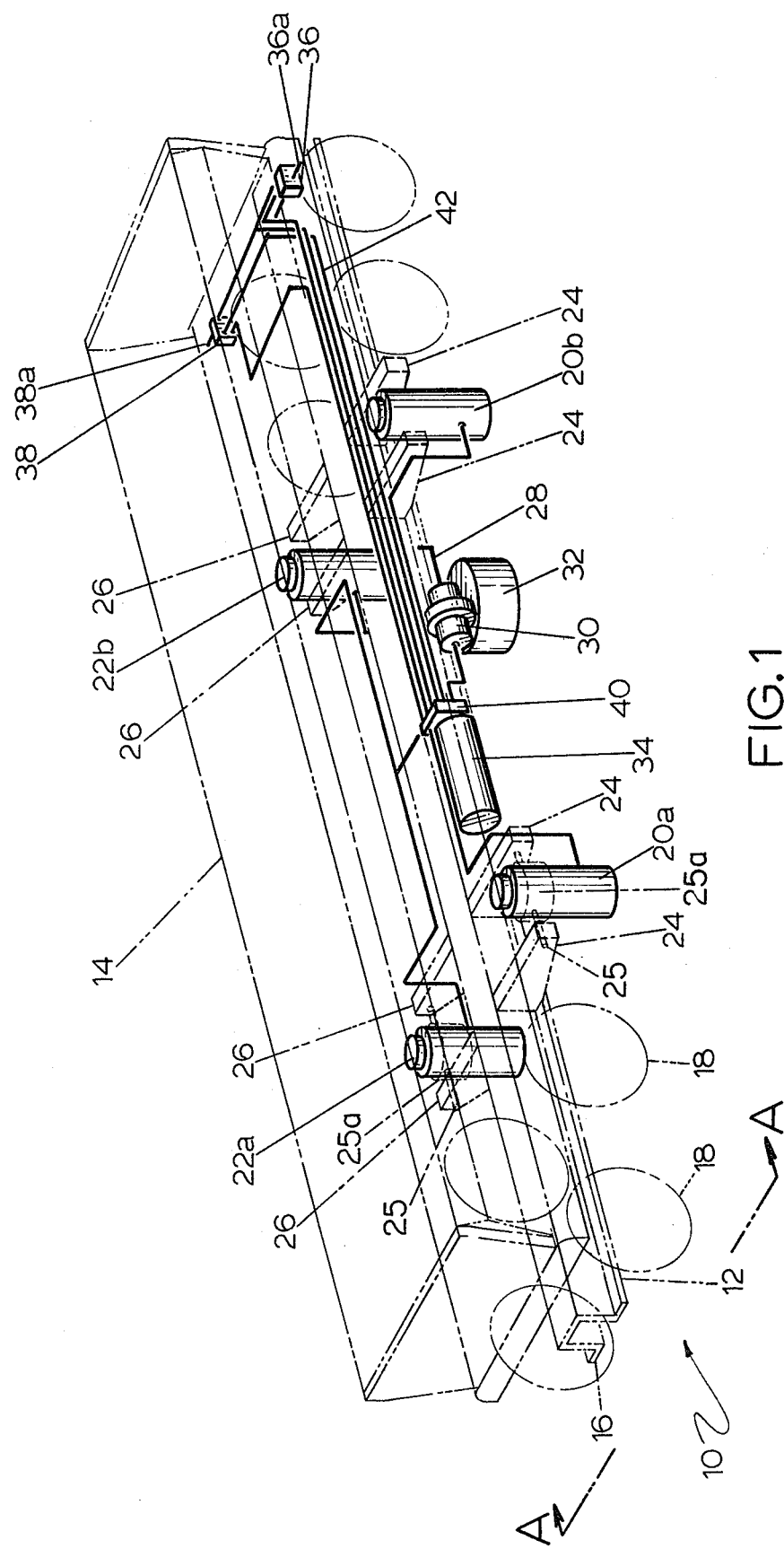
FIG. 1 is a perspective view showing a hydraulically powered side dump railroad car utilizing the present invention.
Figure 2:
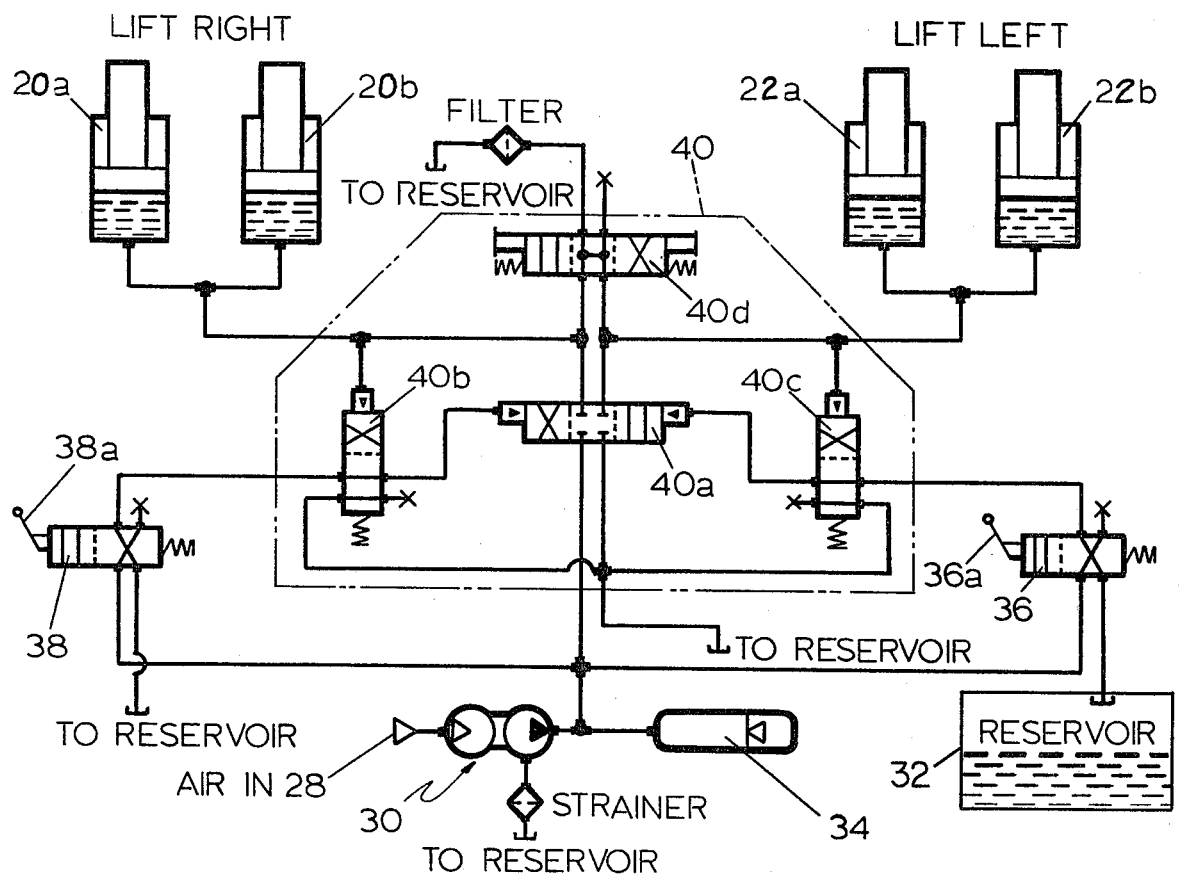
FIG. 2 is a schematic diagram of the hydraulic system of the present invention.

In FIG. 1, the hydraulically actuated dump system is illustrated in use on a conventional side dump rail car 10. The hydraulic system is shown in solid lines, while car 10 is shown in phantom. FIG. 2 also illustrates the hydraulic system of FIG. 1 in schematic diagram form.

Car 10 includes a car frame 12 and a dump body 14 of conventional construction. Frame 12 includes center sill member 16, to which wheels 18 are connected.

Figure 3A:
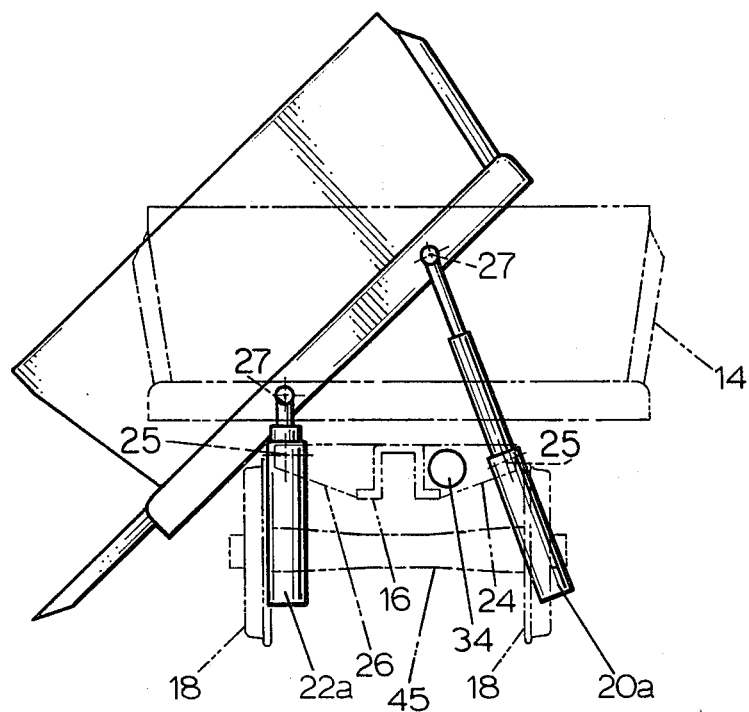
FIGS. 3A and 3B are sectional views along line A—A of FIG. 1 showing positions of the hydraulic actuators when pivoting the dump body for unloading on opposite sides.
Figure 3B:
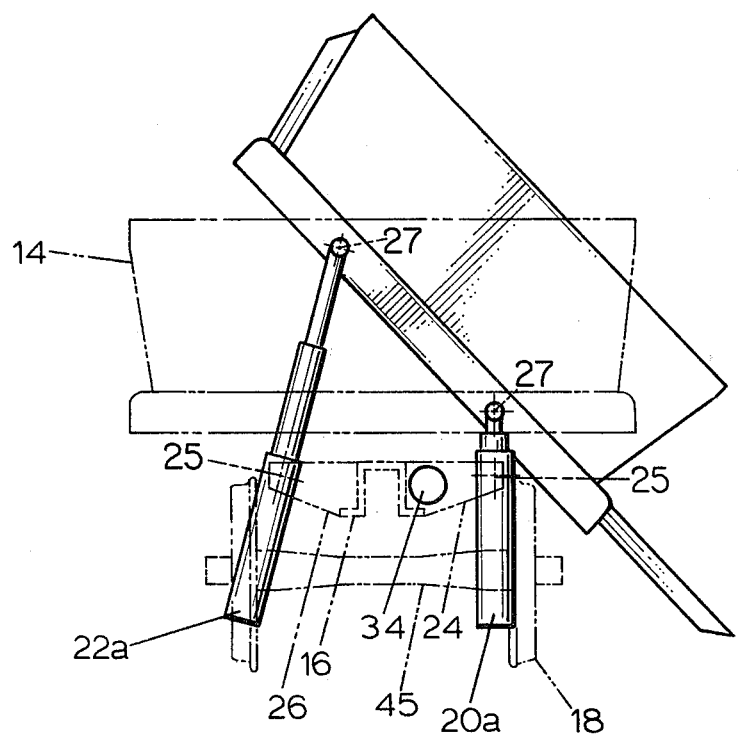

The system of the present invention includes four hydraulic actuators 20a, 20b, 22a, and 22b. Actuators 20a and 20b are positioned on one side of the center sill 16 and are pivotally mounted to outward extending frame members 24. Hydraulic actuators 22a and 22b are positioned on the opposite side of center sill 16 and are pivotally connected to outwardly extending frame members 26. The actuators are pivotally connected to members 24 and 26 of car frame 12 at pivot points 25 as shown in FIGS. 1, 3A and 3B. Preferably, the actuators are pivotally connected to frame 12 by collar means 25a as shown generally in FIG. 1 (collar means not shown on actuators 20b and 22b). Hydraulic actuators 20a, 20b, 22a and 22b are telescopic hydraulic cylinders, which are pivotally connected at their upper ends to dump body 14 at pivot points 27 as shown in FIGS. 3A and 3B. To dump the contents of dump body 14 on one side of the car, hydraulic actuators 20a and 20b are energized, thereby lifting the other side of dump body 14 as shown in FIG. 3A. Conversely, to dump the contents on the opposite side of the car, hydraulic cylinders 22a and 22b are actuated, thereby lifting their side of the dump body 14, as illustrated in FIG. 3B.

In the embodiment of the present invention shown in FIGS. 1–3B, the power for the operation of hydraulic cylinders 20a, 20b, 22a and 22b is derived from the auxiliary air supply of the train to which car 10 is connected. Auxiliary air line 28 is connected to the train's auxiliary air system, and provides pressurized air at approximately 90 psi or above. A regulator (not shown)

preferably regulates the pressure of the pressurized air to a known pressure, such as 90 psi. In the present invention, this relatively low pressure air is converted to a much higher hydraulic pressure to operate hydraulic cylinders 20a, 20b, 22a and 22b. The auxiliary air from line 28 is supplied to hydraulic booster pump 30, which pumps hydraulic fluid from hydraulic fluid reservoir 32 to hydraulic storage accumulator 34. Booster pump 30 preferably includes a large bore air cylinder connected to a small bore hydraulic cylinder. The large bore air cylinder is reciprocated using the 90 psi air pressure from air line 28. This drives the small bore hydraulic cylinder to pump hydraulic fluid from reservoir 32 at a pressure determined by the ratio of the cross sectional areas of the large bore air cylinder and the small bore hydraulic cylinder. In a preferred embodiment of the present invention, the areas of the two interconnected cylinders of the booster pump 30 is about 34:1. The 90 psi inlet air pressure produces a hydraulic pressure of about 3060 psi at 1/34th the flow rate. In other systems in which air pressure of about 140 psi is available, a ratio as low as about 20:1 may be used to provide hydraulic pressure of about 3000 psi.

Once pumped out of reservoir 32 by booster pump 30, the hydraulic fluid enters accumulator 34. In the preferred embodiment of the present invention, accumulator 34 has a first chamber for receiving and holding the hydraulic fluid under pressure, and a second chamber which contains a compressible fluid such as dry nitrogen gas. The first and second chambers are separated by a bladder or piston. As the hydraulic fluid enters the first chamber, the compressible fluid in the second chamber is compressed. It is this compression that, when needed, allows accumulator 34 to push out the hydraulic fluid into hydraulic cylinders 20a and 20b or 22a and 22b. In effect, the compressibility of the nitrogen gas acts as a spring to force the hydraulic fluid out of accumulator 34 when needed.

In the embodiment shown in FIG. 1, the hydraulically powered control system includes pilot valves 36 and 38. Pilot valve 36 has a lever 36a which is moved upward by the operator to cause cylinders 20a and 20b to be energized. Valve 40d is simultaneously moved mechanically to the lefthand position.

Similarly, pilot valve 38 has a lever 38a which is moved upward by the operator when he wishes to energize the cylinders 22a and 22b. Valve 40d is simultaneously moved mechanically to the righthand position. Lowering from either position is effected by returning valve 40d to its center position.

The operation of pilot valve 36, therefore, causes dump body 14 to be raised by cylinders 20a and 20b, and causes dump body 14 to dump toward the side away from the operator (as illustrated in FIG. 3A). Similarly, operation of pilot valve 38 causes cylinders 22a and 22b to be energized, thereby causing dump body 14 to again dump away from the operator (as illustrated in FIG. 3B).

Pilot valves 36 and 38 are connected to main valve 40 by hydraulic lines 42. When lever 36a of pilot valve 36 is moved upward, main valve 40 causes hydraulic fluid from accumulator 34 to be provided to hydraulic cylinders 20a and 20b. Similarly, when lever 38a of pilot valve 38 is moved upward, valve 40 provides pressurized hydraulic fluid from accumulator 34 to cylinders 22a and 22b.

In another embodiment of the present invention, mechanical torque rods are used in place of pilot valves 36 and 38 to control main valve 40.

In one typical embodiment of the present invention, cylinders 20a, 20b, 22a, and 22b are 6"×4½"×51" telescopic hydraulic lift cylinders. The force of actuation during different portions of the 51" stroke of the cylinders is shown in the following table:

TABLE I

| Stroke | Force of Actuation |
|---|---|
| 0" through 12" | 70,000 lbs. minimum |
| 12" through 36" | 70,000 lbs. at 12" stroke decreasing linearly to 0 lbs. at 36" stroke |
| 36" through 51" | 0 to negative lbs. |

In addition to these requirements, the hydraulic system is optionally capable of raising to a 10" stroke, retracting, and then raising through the full 51" stroke with the forces of actuation indicated in TABLE I. Full dumping of the contents of dump body 14 occurs in 15 seconds, and lift cylinders 20a, 20b, 22a and 22b fully retract from the 51" stroke in another 15 seconds.

Booster pump 30 increases the 90 psi air pressure received from pipe 28 to hydraulic pressure of about 3000 psi. The time required to charge accumulator 34 to about 3000 psi is approximately ten minutes. Once the pressure of 3000 psi is reached, booster pump 30 stalls, since it does not have enough power to overcome the stored hydraulic pressure within the first chamber of accumulator 34. The full pressure within accumulator 34 is held by means of pressure balance, and no valving is required to maintain the stored 3000 psi pressure.

Accumulator 34 preferably has a capacity of up to 15 gallons of hydraulic fluid, although capacity depends upon the requirements of the system. The volume of accumulator 34 is sufficient so that two of the hydraulic cylinders (20a and 20b or 22a and 22b) can be raised to a stroke of 10", retract, and then raise again to a 12" stroke without the pressure within accumulator 34 decreasing below about 2475 psi.

In this particular preferred embodiment, accumulator 34 is precharged to 1650 psi. As the hydraulic cylinders are extended beyond the 12" stroke, accumulator pressure decreases in proportion to cylinder stroke from 2475 psi to the precharged pressure of 1650 psi.

As illustrated in FIG. 2, valve 40 preferably consists of a drilled manifold containing individual valves 40a, 40b, and 40c and 40d. Valve 40 is itself a manifold mounted directly to the end of storage accumulator 34. Connections between the various components of valve 40 are made via cross drilled holes. Valves 40a, 40b and 40c are operated via hydraulic pressure. Valve 40d is mechanically operated via a torque rod (not shown) from the end of the rail car on which valves 36 and 38 are mounted. Valve 40a provides lift to the left or lift to the right. Valve 40d provides for lowering from either position. Valves 40b and 40c are opposite side lockout valves to ensure that once lifting one side of body 14 has commenced the other side cannot be operated until car body 14 is returned to the normal position.

With both lever valves 36 and 38 in the unactuated position, and mechanically operated valve 40d in its normal (center) position, all valves are in the positions shown in FIG. 2. Pump 30 is connected to the accumulator 34 but the inlet ports of other interconnected valves 36, 38 and 40a are blocked. This allows oil from pump 30 to charge only accumulator 34. Any unwanted leakage through valve 40a has a direct path back to the reservoir through valves 40b, 40c or 40d. This ensures that unwanted leakage through valve 40a will not cause valve 40a to inadvertently shift or that should an inadvertent shift occur, unintended cylinder raising will not occur because the oil will have a direct path back to the reservoir via valve 40d.

To prepare the system for operation to the left, valve 40d is mechanically shifted to the lefthand position (straight through porting configuration). Valve 40d acts as a safety valve and must be triggered before the system may be operated. Preferably, valve 40d is operated manually. Once valve 40d has been shifted, valve 38 can be manually shifted to direct system pressure through valve 40b to the pilot port of valve 40a causing it to shift to the lefthand position (crossed porting). This then allows oil from the accumulator to enter the cylinders marked "lift left" and effect car body raising. Note that valve 40d effectively blocks oil flow through it and at the same time prevents inadvertent pressure buildup in the lift right cylinders by means of a path back to the reservoir. Note also that any pressure buildup in the left lift cylinder line will shift valve 40c, thus preventing valve 40a from receiving a pilot signal from valve 36 until the dump body is once again lowered. Since the circuit is symmetrical, the same functions occur in a "lift right" mode of operation.

In preferred embodiments, a padlock or other mechanical lock is provided to lock valve 40d in the center position when the rail car is in transit or on a siding. This provides three significant advantages: First, unauthorized operation of the circuit will only bleed oil from accumulator 34 to the reservoir via valve 40a and 40d. It will not result in unauthorized dump body actuation. Second, leakage through a complete malfunction of valve 40a will not cause unwanted dump body actuation. Third, locking of valve 40d in the failsafe position for transit and car storage is mechanical and positive. It is not subject to hydraulic malfunctions, and, by use of a padlock, is vandalproof.

Hydraulic actuation of valve 40a for raising is used to allow the pilot lines to be "interrupted" by valves 40b and 40c, giving "opposite side lockout" capability. A malfunction of any of these valves results in the system not operating, a condition felt to be a failure in a "safe" (unraised) condition—i.e., failsafe.

Mechanical actuation of valve 40d is used to ensure that it is centered when raising of car body 14 is not wanted. The mechanical actuation is more positive than hydraulic (pilot) actuation, thus ensuring failsafe car operation.

Figure 4:
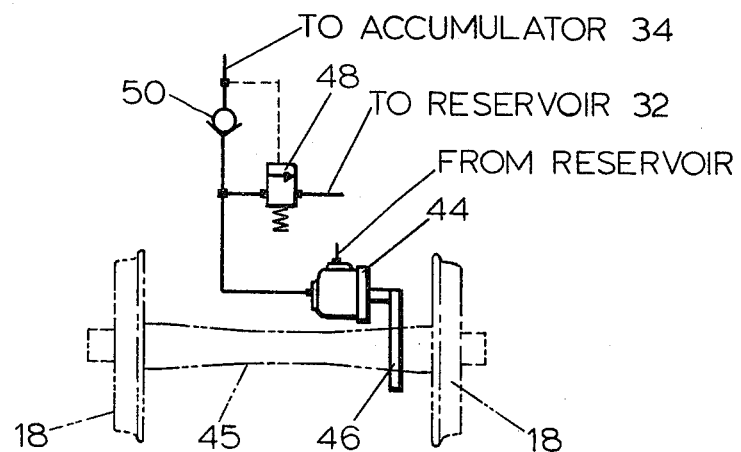
FIG. 4 shows another embodiment of the present invention.

In another preferred embodiment illustrated in FIG. 4, the requirement for an auxiliary air line 28 as the ultimate primary source of power can be eliminated entirely. In place of air driven pump 30, bidirectional rotary pump 44 is driven from rail car axle 45 by mechanical means 46 such as a chain, belt or eccentric. Pump 44 is preferably a pump capable of delivering oil out of a given port, regardless of the direction of shaft rotation, such as the Dynet/Rivett check ball pump. Pump 44, like the air driven pump 30 of FIGS. 1 and 2, draws oil from the reservoir and delivers it to storage accumulator 34. When a full charge of approximately 3000 psi is reached, unloading valve 48 opens to vent the pump flow back to the reservoir. Check valve 50 is used to prevent dumping of the accumulator when the pump is vented.

The principal advantage of this embodiment is that it does not require an auxiliary air line, and as such, allows side dump cars to be used in trains having cars not so equipped.

The system of the present invention has significant performance, safety and cost advantages over the prior art cylinder operated dump cars.

First, the hydraulic system uses a non-compressible fluid (oil) rather than a compressible fluid (air). As a result, control of the car dumping mechanism is smoother, more positive, and more precise using the present invention.

Second, the hydraulic system of the present invention can be operated even when the car is disconnected from the train, since storage accumulator 34, once charged, holds the hydraulic fluid pressure even after the car is disconnected from the train. The prior art air operated system, on the other hand, requires that the car be connected to the train, and that the air cylinders be connected to the auxiliary air system of the train in order to operate it. The present invention may also be provided with an automatic bleed down mechanism so that, after a period of time, the stored fluid within accumulator 34 is bled back to reservoir 32. This eliminates any safety hazard caused by unauthorized operation of the dumping mechanism long after the car has been disconnected from the train.

Third, if a need should arise to operate a dump car when storage accumulator 34 is in its normal, uncharged state, and the car is not connected to the auxiliary air system, a hand operated hydraulic pump can be used to charge accumulator 34. By use of a hand operated pump, full operation is possible in about thirty minutes. In the case of the prior art air powered system, manual operation is simply not possible.

Fourth, the system of the present invention eliminates the freeze-up problem which is encountered with the prior art air operated systems in cold weather climates. The hydraulic system of the present invention has only one short air line 28. This line, which leads to pump 30 is preferably connected to pump 30 from the underside. By mounting booster pump 30 horizontally, any water in the air lines will drain out before it can freeze. Since there are no high speed rotating components depending on oil film, the remainder of the hydraulic system is preferably filled with low viscosity oil which is unaffected by cold weather. In contrast, the prior art operated systems have a myriad of low spots in which water vapor can condense. It is impossible in the prior art systems to drain every valve and pipe fitting which could cause line freezing. In addition, the large air cylinders used in the prior art system must be vertically mounted, which invites malfunction due to freezing.

Fifth, with the prior art air systems, holding of a dump body in midposition is impossible due to the inherent high leakage of large bore air cylinders. With the present invention, on the other hand, holding of the dump body is possible for extended periods of time. Should the operator or other personnel be under the dump body when holding is required, the dump body is held in midposition indefinitely.

Sixth, while the incompressibility of hydraulic fluid provides a smoother operating car, it also provides a safer car due to more positive control. In the prior art air operated systems, compressibility of air makes stopping of high inertia, neutral force loads very difficult. Additional powered movement is possible with the prior art systems even though the control lever has been released. With the hydraulic system of the present invention, only the inertia of the dump body needs to be overcome, not residual forces of the fluid itself.

Seventh, the use of small bore hydraulic cylinders (approximately 6" diameter) rather than the large bore air cylinders (approximately 26" diameter) greatly enchances the serviceability of the present invention in comparison to the prior art systems. The largest single maintenance liability of the prior art air systems is the need for the large bore air cylinders. The cylinders are specially designed and are not "standard" components. Replacement of an air cylinder can mean a wait of many weeks or months for delivery from the manufacturer, while the side dump car remains out of service.

Eighth, the hydraulic cylinders utilized in the present invention are much easier to replace than the large bore air cylinders used in the prior art systems. The extreme size and weight of the air cylinders makes replacement very difficult, while the small bore hydraulic cylinders can be changed by two men.

Ninth, the large bore air cylinders used in the prior art systems are extremely expensive and are typically manufactured by only a single manufacturer. In contrast, the hydraulic cylinders utilized in the present invention need not be specially designed and are available from multiple manufacturers. In addition, all of the other hydraulic components of the present invention are commercially available—specially designed components are not required.

Tenth, the small size of the hydraulic cylinders (and the other components of the system) permit the present invention to be readily retrofitted to existing side dump cars having the prior art air operated system.

In addition to the preferred embodiment of the present invention shown in FIGS. 1–3B, other railroad dump cars may successfully utilize the hydraulically powered system of the present invention. For example, in another successful embodiment, only a single pair of hydraulic cylinders mounted at opposite ends of dump body 14 are used instead of four hydraulic cylinders as illustrated in FIG. 1. The relatively small size of the hydraulic cylinders permits much greater flexibility in the design of the dumping mechanism and in the location of the hydraulic cylinders.

The system of the present invention also can be utilized in other types of dump cars, in which some other form of movable dumping mechanism is moved to permit dumping of the contents of the car. A bottom dump slide gate car is an example of another type of car which can make advantageous use of the present invention. The system of the present invention replaces the prior art air powered systems which use air cylinders to effect movement of the dumping mechanisms. Similar advantages to those achieved in side dump cars are achieved by the use of the present invention with other forms of dump cars.

Although the present invention has been described with reference to preferred embodiments, those skilled in the art will recognize that changes may be made in form and detail without departing from the spirit and scope of the invention.

What is claimed is:

1. For use in a railroad dump car which includes movable means for causing dumping of contents of the dump car, the improvement comprising:
   hydraulic reservoir means for providing hydraulic fluid;
   pump means driven by a source of power associated with the railroad dump car for pumping hydraulic fluid under pressure from the hydraulic reservoir means;
   hydraulic accumulator means for receiving the hydraulic fluid from the pump means and storing the hydraulic fluid under pressure;
   hydraulic actuator means for moving the movable means to cause dumping of contents of the dump car; and
   means for selectively causing the hydraulic accumulator means to supply pressurized hydraulic fluid to the hydraulic actuator means causing the hydraulic actuator means to move the movable means to cause dumping of contents of the dump car.

2. The invention of claim 1 in which the hydraulic accumulator means has a first chamber for receiving and storing hydraulic fluid and a second chamber containing a compressible fluid, and wherein as pressurized fluid is pumped from the pump means to the first chamber of the hydraulic accumulator means, the compressible fluid within the second chamber of the hydraulic accumulator means is compressed.

3. The invention of claim 1 wherein the railroad dump car is a side dump car having a car frame and a dump body pivotally connected to the car frame.

4. The invention of claim 3 wherein the hydraulic actuator means is connected between the car frame and the dump body, and in which the hydraulic actuator means pivots the dump car in response to hydraulic fluid from the hydraulic accumulator means.

5. The invention of claim 4 in which the hydraulic actuator means is pivotally connected to the car frame and pivotally connected to the dump body.

6. The invention of claim 5 wherein the hydraulic actuator means comprises a pair of hydraulic cylinders each pivotally connected to the car frame and the dump body on one side of a pivot axis.

7. The invention of claim 6 wherein the hydraulic actuator means further comprises a second pair of hydraulic cylinders pivotally connected to the car frame and the dump body on a second, opposite side of the pivot axis.

8. The invention of claim 1 wherein the source of power associated with the railroad dump car includes means for supplying pressurized air, and wherein the pump means receives and is driven by the pressurized air.

9. The invention of claim 8 in which the means for supplying pressurized air comprises an air supply conduit for connection to an auxiliary air supply of a railroad train.

10. The invention of claim 8 in which the pump means comprises a large bore air cylinder for receiving and reciprocating in response to the pressurized air; and a small bore hydraulic cylinder coupled to and driven by the large bore air cylinder for pumping hydraulic fluid from the hydraulic reservoir means to the hydraulic accumulator means.

11. The invention of claim 8 wherein the ratio of cross sectional area of the large bore air cylinder to the small bore hydraulic cylinder is greater than about twenty to one.

12. The invention of claim 1 wherein the pump means is a bidirectional rotary pump, and wherein the source of power associated with the railroad dump car comprises means connected to an axle of the car for driving the pump.

13. The invention of claim 12 and further comprising unloading valve for directing fluid from the pump back to the hydraulic reservoir means when pressure of fluid in the accumulator means attains a predetermined value.

14. The invention of claim 1 wherein the railroad dump car is a side dump car having a car frame and a dump body pivotally connected to the car frame, and wherein the hydraulic actuator means comprises first actuator means for pivoting the dump body in a first direction and second actuator means for pivoting a dump body in a second direction.

15. The invention of claim 14 wherein the means for selectively causing the hydraulic accumulator means to supply pressurized hydraulic fluid to the hydraulic actuator means comprises:
- means for selecting one of the first and the second actuator means for operation;
- main valve means for supplying pressurized hydraulic fluid from the accumulator means to the selected first and second actuator means;
- first side lockout valve means for preventing operation of the first actuator means when the second actuator means is selected; and
- second side lockout valve means for preventing operation of the second actuator means when the first actuator means is selected.

16. The invention of claim 15 wherein the means for selecting one of the first and the second actuator means comprises first and second pilot valve means, respectively, and wherein the main valve means and the first and second side lockout valve means are hydraulically actuated valves.

17. The invention of claim 16 and further comprising mechanically operated safety valve means connected to the main valve means for preventing operation of the first and second actuator means when in a normal state, and permitting operation of the first and second actuator means when in a user operated state.

18. A side dumping railway car comprising in combination:
- a plurality of wheels;
- a car frame carried on said wheels;
- a dump body pivotally connected to the car frame;
- hydraulic actuator means comprising a plurality of hydraulic cylinders, each hydraulic cylinder connected to a pivot point on said car frame at one end of the cylinder and to a pivot point on the dump body at the other end of the cylinder, to permit tilting of the dump body relative to the car frame;
- reservoir means for providing oil;
- oil accumulator means for accumulating pressurized oil;
- tilt control valve means connected between the accumulator means and the hydraulic actuator means for selectively providing pressurized oil from the accumulator means to the hydraulic actuator means to operate the hydraulic actuator means; and
- an air to oil pressure intensifier on said car adapted to pump oil from the reservoir means to the oil accumulator means.

* * * * *